United States Patent [19]
Lee et al.

[11] Patent Number: 6,077,417
[45] Date of Patent: Jun. 20, 2000

[54] SILICON MICROLENS CLEANING SYSTEM

[75] Inventors: Kim Y. Lee, Fremont; T. H. Philip Chang, Foster City; Ho-Seob Kim, Fremont, all of Calif.

[73] Assignee: Etec Systems, Inc., Hayward, Calif.

[21] Appl. No.: 09/195,843

[22] Filed: Nov. 19, 1998

[51] Int. Cl.[7] .................................................. H01J 37/26
[52] U.S. Cl. ................... 205/769; 205/687; 250/396 R; 250/397; 219/600; 373/166
[58] Field of Search .................... 205/769, 687; 219/600; 373/166; 250/397, 396 R

[56] References Cited

U.S. PATENT DOCUMENTS

| | | | |
|---|---|---|---|
| 5,122,663 | 6/1992 | Chang et al. | 250/310 |
| 5,155,412 | 10/1992 | Chang et al. | 315/14 |
| 5,451,303 | 9/1995 | Heiler et al. | 205/769 |

OTHER PUBLICATIONS

Chang, T.H.P. et al., "Electron Beam Sources and Charged–Particle Optics", *SPIE* vol. 2522, pp. 4–12 (1995). no month.

Chang, T.H.P. et al., "Electron–beam Microcolumns for Lithography and Related Applications", *J. Vac. Sci. Technol.* B 14(6), pp. 3774–3781 (1996). no month.

Chang, T.H.P. et al., "Electron Beam Technology—SEM to microcolumn", *Microelectronic Engineering*, 32: pp. 113–130 (1996). no month.

Kim, H.S. et al., "Miniature Schottky Electron Source", *J. Vac. Sci. Technol.* B 13(6), pp. 2468–2472 (1995). no month.

Kratschmer, E. et al., "Experimental Evaluation of a 20 × 20 mm Footprint Microcolumn", *J. Vac. Sci. Technol.*, B 14(6), pp. 3792–3796 (1996). no month.

Lee, K.Y., "High Aspect Ratio Aligned Multilayer Microstructure Fabrication", *J. Vac. Sci. Technol.*, B 12(6), pp. 3425–3430 (1994). no month.

Thomson, M.G.R. et al., "Lens And Deflector Design For Microcolumns", *J. Vac. Sci. Technol.*, B 13(6) pp. 2445–2449 (1995). no month.

*Primary Examiner*—Arun S. Phasge
*Attorney, Agent, or Firm*—Skjerven, Morrill, MacPherson, Franklin & Friel LLP; John T. Winburn

[57] ABSTRACT

A method and system for cleaning the silicon microlenses in an electron-beam microcolumn in situ. The microlenses individually are heated by passing a current through each microlens. The current is utilized to heat the microlens to at least two hundred degrees Centigrade to prevent contamination and occasionally to a temperature on the order of six to seven hundred degrees Centigrade to remove any builtup or potential contamination.

23 Claims, 2 Drawing Sheets

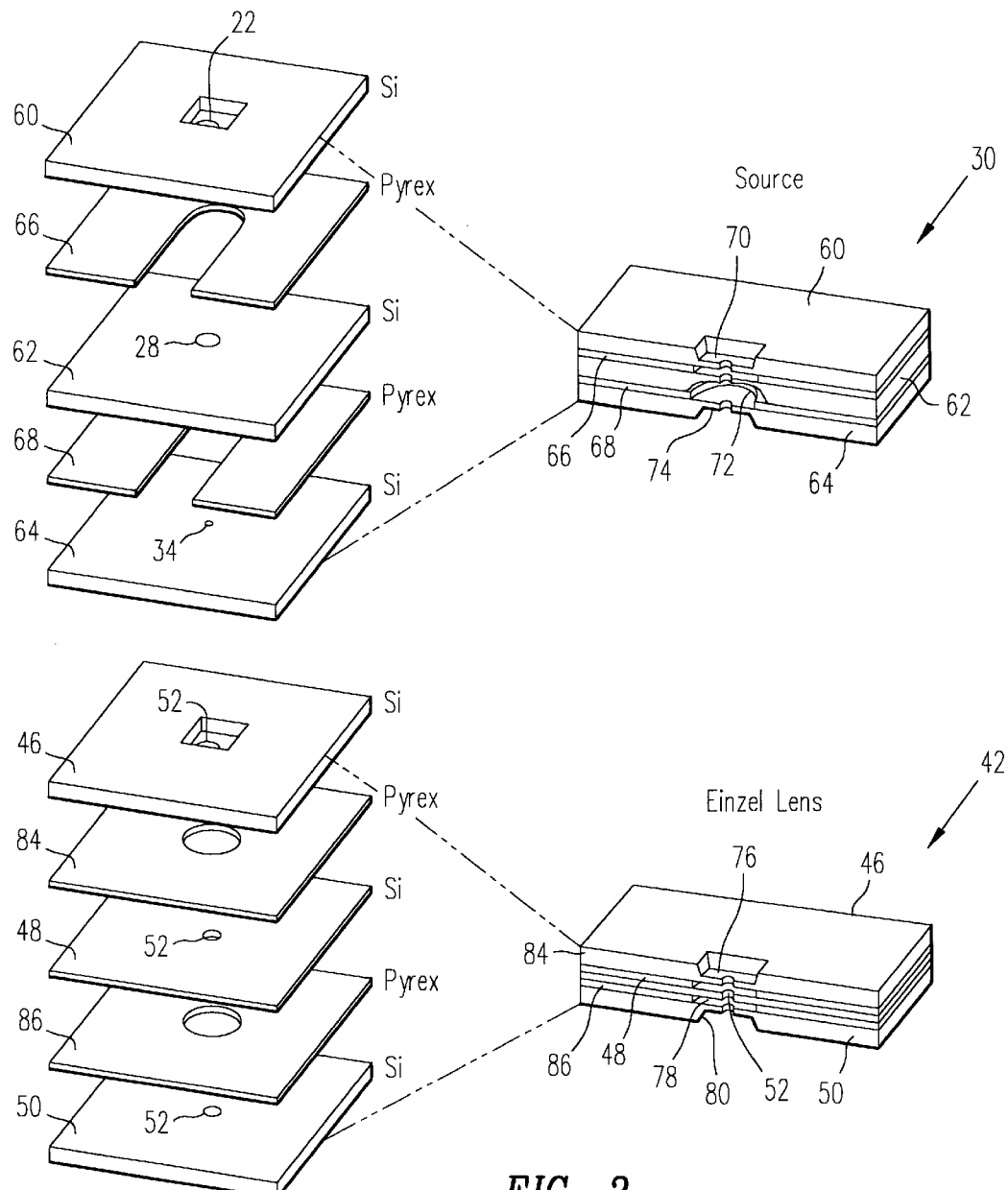
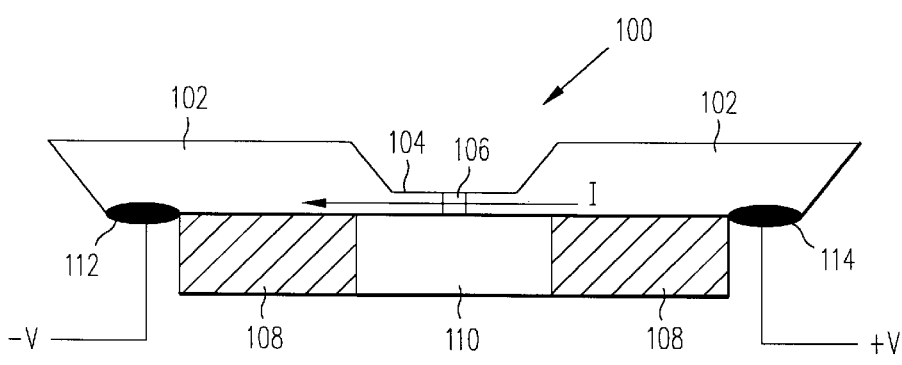
*FIG. 2*
*FIG. 3*

SILICON MICROLENS CLEANING SYSTEM

BACKGROUND

1. Field of the Invention

The present invention relates to charged particle imaging using electron beam microcolumns and in particular a cleaning method and system for cleaning the silicon microlenses in the microcolumns.

2. Description of Related Art

In recent years, there has been a significant increase in interest in low voltage scanning electron microscopy (SEM) for applications in surface inspection of materials, metrology, testing and lithography.

Conventional scanning electron microscopes are large immobile devices. Although scanning electron microscopes have many applications, such as semiconductor related inspection and testing, conventional scanning electron microscopes are limited in their usefulness because of their size, immobility, and associated costs. For instance, because the sample being observed, as opposed to the electron microscope, must be moved during the inspection process, a conventional scanning electron microscope requires the use of a vacuum chamber that is much larger than the sample. Further, the sample must be positioned at an angle relative to a conventional scanning electron microscope to produce a beam incidence angle required for three-dimensional-like surface feature imaging, which makes handling large or delicate samples difficult. Moreover, throughput of a conventional electron microscope is limited because only one electron microscope can observe a sample at a time.

An effort to improve electron-beam systems has resulted in miniature electron-beam microcolumns ("microcolumns"). Microcolumns are based on microfabricated electron "optical" components and field emission sources operating under principles similar to scanning tunneling microscope (STM) aided alignment principles. Also called STM aligned field emission (SAFE). The alignment principles used by microcolumns are similar to STMs in that a precision X-Y-Z positioner is used to control a sharp tip, and to utilize the emission from the tip to measure the position of the tip. Microcolumns are discussed in general in the publication "Electron-Beam Microcolumns for Lithography and Related Applications," by T. H. P. Chang et al., *Journal of Vacuum Science Technology*, Bulletin 14(6), pp. 3774–81, November/December 1996, which is incorporated herein by reference.

The microcolumns are formed of high aspect ratio micromechanical structures, including microlenses and deflectors. The microlenses are multi-layers of silicon, including silicon membrane windows (apertures) which act as the microlens electrodes. The layers are spaced apart with and typically bonded to thick one hundred (100) to five hundred (500) microns insulating layers. The lenses have apertures with diameter that vary from about two (2) to two hundred (200) microns. For optimum performance, the apertures or bores are required to be formed with an interior bore smoothness in the nanometer regime and the alignment required is on the order of less than one micron. No tolerance for contamination of the lens aperture can be allowed.

It thus would be desirable to achieve cleaning of the silicon microlenses in situ during operation of the microcolumns.

SUMMARY

A method and system for cleaning the silicon microlenses of an electron-beam microcolumn in situ. The microlenses are individually heated by passing a current through each microlens. Each microlens includes a thick body portion and a thin central member with a lens aperture formed therein. The current is utilized to heat the microlens to at least two hundred degrees Centigrade to prevent contamination of the lens aperture and at least occasionally to a temperature on the order of six to seven hundred degrees Centigrade to remove potential contamination.

BRIEF DESCRIPTION OF DRAWINGS

FIG. 2 is an exploded perspective view of a microcolumn source and microlens which can incorporate the present invention.

FIG. 3 is a side sectional view of one embodiment of the microlens cleaning system of the present invention.

Utilization of the same reference numerals in different FIGS. indicates similar or identical elements, structurally and/or functionally.

DETAILED DESCRIPTION OF THE PREFERRED EMBODIMENT

Figure 1:
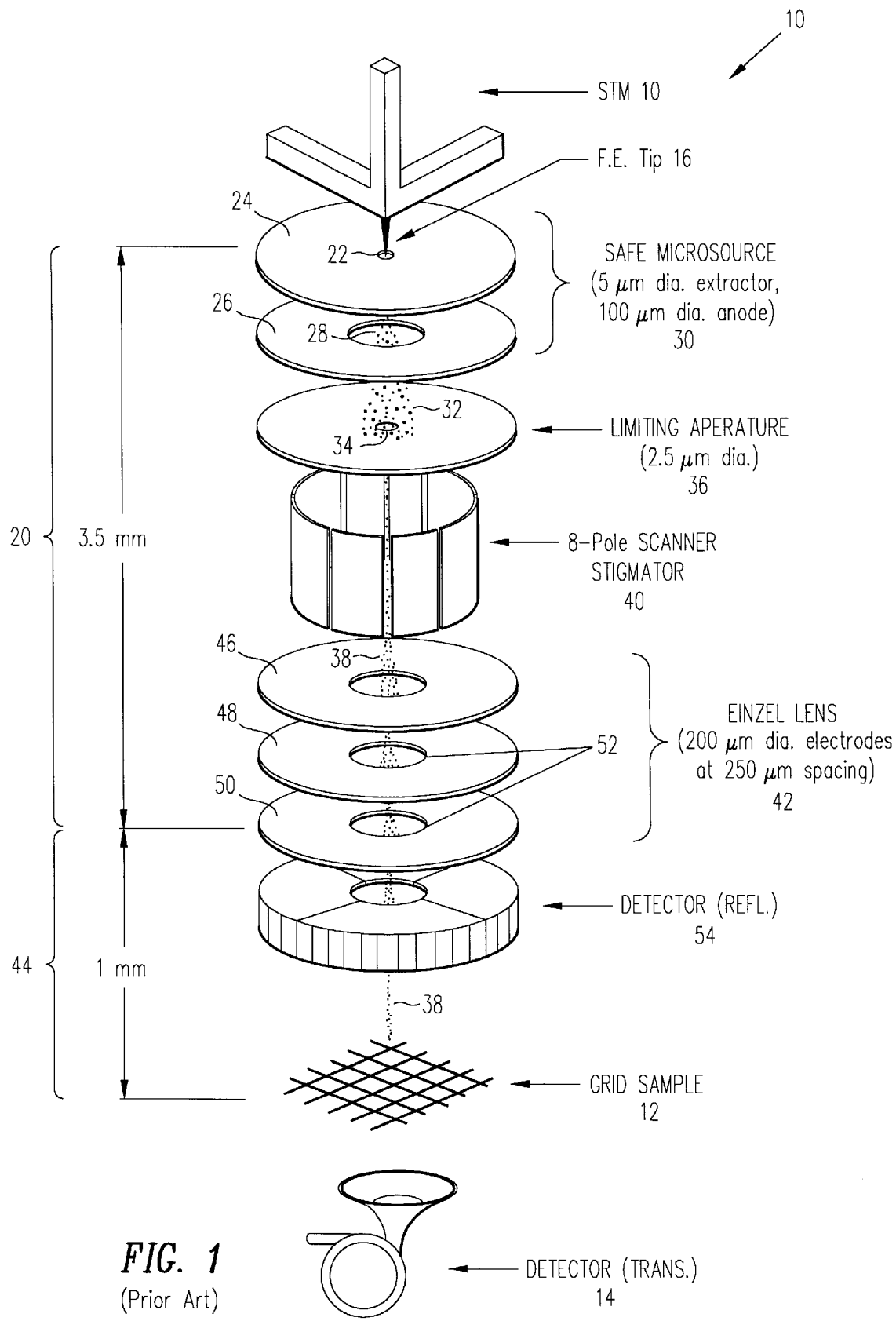
FIG. 1 is an exploded perspective view of a microcolumn which can incorporate the present invention.

Referring to FIG. 1, a prior art microcolumn is designated generally by the reference numeral 10, illustrated with a grid sample 12 and a channeltron electron detector 14 which is utilized to generate scanning transmission electron microscope (STEM) images from electron transparent samples. The microcolumn includes an electron source, which can be a miniature cold-field or Schottky emitter having a field emitter tip 16. The tip 16 can be a Zr/O/W Schottky-type emitter tip or if a cold emitter tip, could be a single crystal tungsten, hafnium carbide or diamond tip. The tip 16 preferably is mounted on a positioner 18, such as a three axis STM type X-Y-Z positioner. The positioner 18 has a range of movement on the order of tens of microns up to about one (1) millimeter (mm) in each axis. The positioner 18 has a nanometerscale positioning accuracy capability and is utilized to align the tip 16 with an electron optical column 20. The column 20 can have a length on the order of three and one-half (3.5) mm.

The tip 16 is aligned with a five (5) micron aperture 22 for example purposes, in an extractor 24. The extractor 24 is combined with an anode 26, having an aperture 28 on the order of one hundred (100) microns to form a selectively scaled dual electrode source lens 30. The resulting electron beam 32 is directed to a beam limiting aperture 34 in an aperture member 36. The aperture 34 is on the order of several microns, illustrated as two and one-half (2.5) microns, in diameter. The spacing and aperture size selected determine the convergence of the resulting e-beam 38 at the grid 12.

From the aperture 34, the beam 38 is passed through a beam deflector 40 which can be a single unit or a multiple unit octupole scanner/stigmator. The deflector 40 is utilized to deflect or scan the beam 38 across the sample 12. A multiple electrode Einzel lens 42 focuses the beam 38 onto the sample 12 at a working distance 44 of one (1) to two (2) mm. The lens 42 can, for example, include three electrodes 46, 48, 50, each having an aperture 52 with a diameter on the order of two hundred (200) microns.

The microcolumn 10 also can include an electron detector 54, which can be a microchannel plate base reflected electron detector for secondary and backscattered electrons or a metal-semiconductor metal detector for low energy backscattered electrons. The microcolumn 10 can be operated to produce a 1 KeV beam 38.

It is understood that FIG. 1 illustrates merely one example of many possible field emission sources and electron optical columns that may be utilized in the microcolumn 10. For additional field emission sources and electron optical columns that may be used in the microcolumn 10 in general, see the following articles and patents: "Experimental Evaluation of a 20×20 mm Footprint Microcolumn", by E. Kratschmer et al., *Journal of Vacuum Science Technology*, Bulletin 14 (6), pp. 3792–96, November/December 1996; "Electron Beam Technology—SEM to Microcolumn," by T. H. P. Chang et al., *Microelectronic Engineering* 32, pp. 113–130, 1996; "Electron-Beam Sources and Charged-Particle Optics, *SPIE* Vol. 2522, pp. 4–12, 1995; "Lens and Deflector Design for Microcolumns," by M. G. R. Thomson and T. H. P. Chang, *Journal of Vacuum Science Technology*, Bulletin 13 (6), pp. 2245–49, November/December 1995; "Miniature Schottky Electron Source," by H. S. Kim et al., *Journal of Vacuum Science Technology*, Bulletin 13 (6), pp. 2468–72, November/December 1995; U.S. Pat. No. 5,122,663 to Chang et al.; and U.S. Pat. No. 5,155,412 to Chang et al., all of which are incorporated herein by reference.

Referring to FIG. 2, one example of the construction of the source lens 30 and the Einzel lens 42 is illustrated. For additional fabrication details, see "High Aspect Ratio Aligned Multilayer Microstructure Fabrication" by K. Y. Lee, S. A. Rishton, and T. H. P. Chang, *Journal of Vacuum Science Technology*, Bulletin 12 (6), pp. 3425–30, November/December 1994, also incorporated herein by reference. The source 30 includes a plurality of silicon wafers or chips 60, 62 and 64, which are spaced apart by one hundred (100) to five hundred (500) micron thick insulating layers 66 and 68. The layers 60 to 68 are not drawn to scale. The layers 66 and 68 preferably are formed from glass, such as glass sold under the trademark, PYREX. The layers 60 to 68 then preferably are precisely aligned and bonded together to form the source 30, preferably by electrochemical anodic bonding.

Prior to the bonding process, the silicon chips are preformed to include a respective silicon membrane 70, 72, and 74 in each of the chips 60, 62 and 64. The required beam apertures, such as the respective apertures 22, 28 and 34, then are formed by patterning the apertures with electron beam lithography in the membranes 70, 72 and 74. The apertures 22, 28, and 34 are etched utilizing reactive-ion etching. The membranes 70, 72 and 74 are on the order of one (1) to one and one half (1.5) microns thick. The membranes 70, 72 and 74 and the apertures 22, 28 and 34 form the elements 24, 26 and 36 of the lens 30.

In a like manner, the electrodes 46, 48 and 50 of the lens 42 are formed with central silicon membranes 76, 78 and 80, in which are formed respective apertures 52. Again, the lens 42 includes a plurality of PYREX insulating layers 84 and 86, which also include apertures 88 and 90, which are larger in diameter than the apertures 52. The layers 46, 48, 50, 84 and 86 again are aligned and preferably bonded together to form the lens 42.

Once assembled, it is critical that the apertures 22, 28, 34 and 52 in the respective silicon membranes be kept clean and free from contamination. Since the membranes preferably are formed in a permanent array or assembly, it also would be desirable to enable the cleaning or contamination prevention to be performed in situ in the microcolumn 10, preferably while the microcolumn 10 is operating under vacuum. Contamination, generally organic in nature, in or adjacent one or more of the apertures would result in charging and eventual blockages of the contaminated aperture causing instability and failure of the microcolumn 10.

Referring to FIG. 3, a silicon chip 100, which could be any of the elements 24, 26, 36, 46, 48 or 50, is illustrated. The chip 100 includes a thick body portion 102 into which has been formed a central silicon membrane 104. The membrane 104 includes an aperture 106 formed therein, which could be any of the apertures 22, 28, 34 and 52.

The chip 100 is illustrated as mounted on or integral with a spacer 108 having a central aperture 110. Again, the spacer 108 preferably is formed from PYREX glass and is bonded to the chip 100. A like spacer or insulative element (not illustrated) would be formed on the opposite side of the chip 100 as part of a lens assembly or to insulate the chip 100 from the other elements in the microcolumn 10.

To prevent a contamination buildup, the membrane 104 can be heated to a temperature of about two hundred (200) degrees Centigrade (C) to two hundred and fifty (250) degrees C. Applicants have discovered that the membrane 104 can be heated to this maintenance temperature by Joule heating in situ in vacuum. The Joule heating is provided by passing a current I of about two (2) to two and one-half (2.5) amps across the base 104. The current I is provided while applying a voltage of about four (4) volts from a power source (not illustrated) coupled across a pair of electrical contacts 112 and 114. The contacts 112, 114 can be ohmic contacts, such as formed by titanium/aluminum alloy contacts. The temperature of about two hundred (200)° C. can be achieved in a vacuum of $10^{-7}$ Torr in about twelve (12) to eighteen (18) seconds.

If the maintenance or contamination prevention heating has not been applied, or if a contamination buildup has occurred in spite of the heating, Applicants have discovered that the contaminant buildup can be removed by increasing the temperature to a range of six hundred (600) to seven hundred (700)° C. utilizing a current I of about three (3) amps.

The structure of the chip 100 and the membrane 104 facilitates the required heating, by the difference in thickness between the member 104 and the thick body portion 102. The electrical resistivity of the member 104 is then high compared to the portion 102, thus providing the heating in the member 104. Although illustrated with the single silicon chip 100, a like circuit preferably would be connected across each membrane in the microcolumn 10. The current I would be applied, at least at the maintenance level, to substantially continuously heat the membranes to prevent any contamination buildup.

Although the present invention has been described with reference to particular embodiments, the described embodiments are examples of the present invention and should not be taken as limitations. As will be appreciated by those skilled in the art, varius other adaptations and combinations of the embodiments described herein are within the scope of the present invention as defined by the attached claims.

We claim:

1. A method for preventing contamination buildup on a silicon microlens, comprising:
   providing at least one silicon microlens having an aperture therein; and
   coupling a current across said silicon microlens and heating said silicon microlens, to at least about two hundred degrees Centigrade.

2. The method of claim 1, including providing a plurality of silicon microlenses in an array, isolating said silicon microlenses from one another and coupling said current across each said silicon microlens in situ in said array while said silicon microlens is being utilized.

3. The method of claim 1, including substantially continuously coupling said current across said silicon microlens.

4. The method of claim 1, including increasing said current across said silicon microlens and heating said silicon microlens to at least about six hundred (600) degrees Centigrade to remove any built up contamination from said silicon microlens.

5. The method of claim 1, including forming said microlens with a thick body portion and a central thin silicon membrane, said aperture formed in said membrane.

6. A system for preventing contamination buildup on a silicon microlens, comprising:

at least one silicon microlens having an aperture therein; and means for coupling a current across said silicon microlens for heating said silicon microlens to at least about two hundred degrees Centigrade.

7. The system of claim 6, including a plurality of silicon microlenses in an array, said silicon microlenses isolated from one another and means for coupling said current across each said silicon microlens in situ in said array while said silicon microlens is being utilized.

8. The system of claim 6, including means for substantially continuously coupling said current across said silicon microlens.

9. The system of claim 6, including means for increasing said current across said silicon microlens for heating said silicon microlens to at least about six hundred (600) degrees Centigrade for removing any built up contamination from said silicon microlens.

10. The system of claim 6, wherein said coupling means include a pair of ohmic contacts on opposite sides of said silicon microlens.

11. The system of claim 6, including said microlens having a thick body portion and a central thin silicon membrane, said aperture formed in said membrane.

12. A field emission microcolumn, comprising:

at least one silicon microlens having an aperture therein; and means for coupling a current across said silicon microlens for heating said silicon microlens to at least about two hundred degrees Centigrade for preventing contamination buildup on said silicon microlens.

13. The field emission microcolumn of claim 12, including a plurality of silicon microlenses in an array, said silicon microlenses isolated from one another and means for coupling said current across each said silicon microlens in situ in said array while said silicon microlens is being utilized.

14. The field emission microcolumn of claim 12, including means for substantially continuously coupling said current across said silicon microlens.

15. The field emission microcolumn of claim 12, including means for increasing said current across said silicon microlens for heating said silicon microlens to at least about six hundred (600) degrees Centigrade for removing any built up contamination from said silicon microlens.

16. The field emission microcolumn of claim 12, wherein said coupling means include a pair of ohmic contacts on opposite sides of said silicon microlens.

17. The field emission microcolumn of claim 12 including said microlens having a thick body portion and a central thin silicon membrane, said aperture formed in said membrane.

18. A field emission microcolumn, comprising:

at least one silicon microlens having an aperture therein; and a pair of electrical contacts coupling a current across said silicon microlens for heating said silicon microlens to at least about two hundred degrees Centigrade for preventing contamination buildup on said silicon microlens.

19. The field emission microcolumn of claim 18, including a plurality of silicon microlenses in an array, said silicon microlenses isolated from one another and a respective pair of electrical contacts coupling said current across each said silicon microlens in situ in said array while said silicon microlens is being utilized.

20. The field emission microcolumn of claim 18, including said current being substantially continuously coupled across said silicon microlens.

21. The field emission microcolumn of claim 18, including said current coupled across said silicon microlens heating said silicon microlens to at least about six hundred (600) degrees Centigrade for removing any built up contamination from said silicon microlens.

22. The field emission microcolumn of claim 18, wherein said electrical contacts are ohmic contacts on opposite sides of said silicon microlens.

23. The field emission microcolumn of claim 18 including said microlens having a thick body portion and a central thin silicon membrane, said aperture formed in said membrane.

* * * * *